US011433879B2

(12) United States Patent
Ogawa et al.

(10) Patent No.: US 11,433,879 B2
(45) Date of Patent: Sep. 6, 2022

(54) VEHICLE CONTROL SYSTEM

(71) Applicant: MAZDA MOTOR CORPORATION, Hiroshima (JP)

(72) Inventors: Daisaku Ogawa, Hiroshima (JP);
Osamu Sunahara, Hiroshima (JP);
Yasunori Takahara, Hiroshima (JP);
Chikako Ohisa, Hiroshima (JP);
Yuichiro Akiya, Hiroshima (JP);
Atsushi Yamasaki, Hiroshima (JP);
Keiichi Hiwatashi, Hiroshima (JP);
Daisuke Umetsu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 174 days.

(21) Appl. No.: 16/758,059

(22) PCT Filed: Nov. 29, 2018

(86) PCT No.: PCT/JP2018/043997
§ 371 (c)(1),
(2) Date: Apr. 22, 2020

(87) PCT Pub. No.: WO2019/107499
PCT Pub. Date: Jun. 6, 2019

(65) Prior Publication Data
US 2020/0339107 A1    Oct. 29, 2020

(30) Foreign Application Priority Data
Dec. 1, 2017   (JP) .............................. JP2017-231626

(51) Int. Cl.
*B60W 30/045*   (2012.01)
*B60W 30/18*   (2012.01)
(Continued)

(52) U.S. Cl.
CPC .... *B60W 30/045* (2013.01); *B60W 30/18145* (2013.01); *B62D 1/04* (2013.01);
(Continued)

(58) Field of Classification Search
CPC ......... B60W 30/045; B60W 30/18145; B60W 2510/205; B60W 2540/10; B62D 1/04; F02D 11/02
See application file for complete search history.

(56) References Cited

U.S. PATENT DOCUMENTS 4,964,318 A * 10/1990 Ganoung ............... B60W 10/11
123/480
6,334,424 B1 * 1/2002 Ito ....................... B60W 10/101
123/295

(Continued)

FOREIGN PATENT DOCUMENTS

JP    2002115756 A      4/2002
JP    2005145143 A  *   6/2005
(Continued)

OTHER PUBLICATIONS

International Search Report issued in PCT/JP2018/043997; dated Jan. 15, 2019.
(Continued)

*Primary Examiner* — Peter D Nolan
*Assistant Examiner* — Tanya C Sienko
(74) *Attorney, Agent, or Firm* — Studebaker & Brackett PC (57) ABSTRACT

A vehicle control system comprises: an engine (4); an accelerator position sensor (10) configured to detect the position of an accelerator pedal; a steering device; a PCM (14) configured to generate a deceleration in the vehicle to control the attitude of the vehicle, when a steering angle-related value as a parameter related to a steering angle of the
(Continued)

steering device increases; and a brake unit (16) configured to generate a deceleration in the vehicle, independently of reduction of an output torque of the engine, wherein the PCM is configured to generates the deceleration by means of the reduction of the output torque of the engine when a depression of the accelerator pedal is detected by the accelerator position sensor, and to generate the deceleration by the brake unit (16) when the depression of the accelerator pedal is not detected by the accelerator position sensor.

12 Claims, 9 Drawing Sheets

(51) Int. Cl.
 *B62D 1/04* (2006.01)
 *F02D 11/02* (2006.01)
(52) U.S. Cl.
 CPC ....... *F02D 11/02* (2013.01); *B60W 2510/205* (2013.01); *B60W 2540/10* (2013.01)

(56) References Cited

U.S. PATENT DOCUMENTS

| | | | |
|---|---|---|---|
| 6,350,217 B1* | 2/2002 | Unterforsthuber | B60T 13/585 477/174 |
| 6,366,059 B1* | 4/2002 | Wakashiro | B60W 10/26 290/40 C |
| 2003/0109979 A1* | 6/2003 | Schuster | B60T 13/662 701/54 |
| 2003/0236608 A1* | 12/2003 | Egami | G05G 5/03 701/1 |
| 2006/0129300 A1* | 6/2006 | Ishimoto | B60W 30/02 701/72 |
| 2006/0289208 A1* | 12/2006 | Katsuhiro | F01L 13/08 180/65.225 |
| 2011/0046864 A1* | 2/2011 | Kamiya | F02N 11/0822 701/102 |
| 2011/0118954 A1* | 5/2011 | Muta | B60H 1/00764 701/102 |
| 2012/0185117 A1* | 7/2012 | Syed | B60K 6/445 903/903 |
| 2013/0024090 A1* | 1/2013 | Minase | F02D 29/02 701/102 |
| 2013/0030674 A1* | 1/2013 | Minase | F02D 41/021 701/110 |
| 2013/0066508 A1* | 3/2013 | Ueno | B60K 6/48 903/902 |
| 2013/0096759 A1* | 4/2013 | Breton | B60W 20/10 180/65.265 |
| 2013/0131925 A1* | 5/2013 | Isaji | B60W 30/10 701/41 |
| 2013/0211686 A1* | 8/2013 | Shono | B60W 30/18072 701/70 |
| 2013/0226387 A1* | 8/2013 | Hayashi | B60W 20/00 180/65.23 |
| 2013/0238179 A1* | 9/2013 | Syed | B60K 6/24 903/903 |
| 2013/0268175 A1* | 10/2013 | Wang | B60W 10/06 180/65.21 |
| 2014/0012452 A1* | 1/2014 | Blessing | B60W 20/11 903/902 |
| 2014/0277987 A1* | 9/2014 | Rogalski | B60W 30/143 701/93 |
| 2015/0094927 A1* | 4/2015 | Takahashi | B60W 30/143 701/93 |
| 2015/0239442 A1* | 8/2015 | Yamakado | B60W 10/08 701/70 |
| 2015/0314771 A1* | 11/2015 | Dextreit | B60K 6/48 180/65.265 |
| 2015/0360679 A1* | 12/2015 | Johri | B60W 10/08 180/65.265 |
| 2016/0280206 A1* | 9/2016 | Lee | B60W 10/26 |
| 2017/0080923 A1* | 3/2017 | Johri | B60W 10/06 |
| 2017/0183009 A1* | 6/2017 | Isono | B60L 15/20 |
| 2018/0065639 A1* | 3/2018 | Barath | B60W 10/06 |
| 2018/0118220 A1* | 5/2018 | Kimura | B60W 30/045 |
| 2018/0148063 A1* | 5/2018 | Tatsushiro | B60W 30/18009 |
| 2018/0222481 A1* | 8/2018 | Okada | B60K 17/344 |
| 2019/0232799 A1* | 8/2019 | Hirata | B60W 10/08 |
| 2020/0070812 A1 | 3/2020 | Yoshioka et al. | |

FOREIGN PATENT DOCUMENTS

| | | |
|---|---|---|
| JP | 2005306285 A | 11/2005 |
| JP | 2006151179 A | 6/2006 |
| JP | 6112304 B2 | 4/2017 |
| WO | 2017/183418 A1 | 10/2017 |

OTHER PUBLICATIONS

International Preliminary Report on Patentability and Written Opinion issued in PCT/JP2018/043997; dated Jun. 2, 2020.

* cited by examiner

(a) Steering Angle (b) Accelerator position (c) Target Additional Deceleration (d) Torque Reduction Amount (e) Braking Force

Time

FIG.8

(a) Steering Angle (b) Accelerator position (c) Target Additional Deceleration (d) Torque Reduction Amount (e) Braking Force

Time

FIG.9

(a) Steering Angle (b) Accelerator position (c) Target Additional Deceleration (d) Torque Reduction Amount (e) Braking Force Time

(a) Steering Angle (b) Accelerator position (c) Target Additional Deceleration (d) Torque Reduction Amount (e) Braking Force Time

VEHICLE CONTROL SYSTEM

TECHNICAL FIELD

The present invention relates to a vehicle control system, and more particularly to a vehicle control system for controlling the attitude of a vehicle by generating a deceleration in the vehicle.

BACKGROUND ART

Heretofore, there has been known a technique of, in a situation where the behavior of a vehicle becomes unstable due to road wheel slip or the like, controlling the vehicle behavior to enable a safe traveling (e.g., an antiskid brake system). Specifically, there has been known a control device operable to detect the occurrence of vehicle understeer or oversteer behavior during vehicle cornering or the like, and apply an appropriate deceleration to one or more road wheels so as to suppress such a behavior.

As a different type of control from the above control for improving safety in a traveling condition causing the vehicle behavior to become unstable, there has been known a vehicle motion control device operable to adjust deceleration during vehicle cornering and thereby adjust a load to be applied to front road wheels as steerable road wheels, so as to allow a series of driver's manipulations (braking, turning of a steering wheel, accelerating, turning-back of the steering wheel, etc.) during vehicle cornering under a normal traveling condition to be realized naturally and stably, Further, there has been proposed a vehicle behavior control device operable to reduce an output torque of an engine (torque to be generated by the engine) according to a yaw rate-related quantity (e.g., yaw acceleration) corresponding to manipulation of a steering wheel by a driver, thereby making it possible to quickly generate a deceleration in a vehicle in response to start of the steering wheel manipulation by the driver and thus quickly apply a sufficient load to front road wheels as steerable road wheels (see, for example, the following Patent Document 1). In this vehicle behavior control device, in response to start of the steering wheel manipulation, a load is quickly applied to the front road wheels to cause an increase in frictional force between each of the front road wheels and a road surface and thus an increase in cornering force of the front road wheels, thereby improving turn-in ability of the vehicle in an initial phase after entering a curve, and improving responsiveness to a turning manipulation of the steering wheel (i.e., steering stability). This makes it possible to realize vehicle attitude control conforming to the intention of the driver.

CITATION LIST

Parent Document

Patent Document 1: JP6112304B

SUMMARY OF INVENTION

Technical Problem

Meanwhile, during turning of a vehicle, many drivers do not depress an accelerator pedal to cause the vehicle to be kept at a constant vehicle speed or decelerated. However, in the conventional technique as described in the above Patent Document 1, the vehicle attitude control is performed by means of reduction of the output torque of the engine. Thus, the vehicle attitude control cannot be performed in a situation where the accelerator pedal is not depressed, i.e., the engine does not generate any torque for driving the vehicle.

That is, depending on whether or not the accelerator pedal is depressed, there occur two states: one state in which the vehicle attitude control is operated; and another state in which the vehicle attitude control is not operated. Thus, even when the steering wheel is manipulated in the same manner, the vehicle behavior or a steering reaction force varies depending on the operation/non-operation of the vehicle attitude control, so that a feeling of strangeness is likely to be given to the driver.

The present invention has been made to solve the above conventional problem, and an object thereof is to provide a vehicle control system capable of performing vehicle attitude control in the same way irrespective of whether or not an accelerator pedal is depressed, thereby preventing giving a driver a feeling of strangeness.

Solution to Technical Problem

In order to achieve the above object, according to a first aspect of the present invention, there is provided a vehicle control system which comprises: an engine; an accelerator position sensor configured to detect a position of an accelerator pedal; a steering wheel to be manipulated by a driver; and a vehicle attitude control means configured to generate a deceleration in a vehicle to control an attitude of the vehicle, when a steering angle-related value as a parameter related to a steering angle of the steering wheel increases, wherein the vehicle control system further comprises a vehicle deceleration generation means configured to generate a deceleration in the vehicle, independently of the engine, and wherein the vehicle attitude control means is configured to generate the deceleration by means of reduction of an output torque of the engine when a depression of the accelerator pedal is detected by the accelerator position sensor, and to generate the deceleration by the vehicle deceleration generation means when the depression of the accelerator pedal is not detected by the accelerator position sensor.

In the vehicle control system according to the first aspect of the present invention having the above feature, when the accelerator pedal is depressed, the deceleration is generated by means of the reduction of the output torque of the engine, and, when the accelerator pedal is not depressed, the deceleration is generated by the vehicle deceleration generation means, independently of the reduction of the output torque of the engine. That is, even in the situation where the accelerator pedal is not depressed, the deceleration for the vehicle attitude control is generated by the vehicle deceleration generation means, so that it is possible to perform the vehicle attitude control in the same way irrespective of whether or not the accelerator pedal is depressed, thereby preventing giving the driver a feeling of strangeness.

According to a second aspect of the present invention, there is provided a vehicle control system which comprises: an engine; a steering wheel to be manipulated by a driver; and a vehicle attitude control means configured to generate a deceleration in a vehicle to control an attitude of the vehicle, when a steering angle-related value as a parameter related to a steering angle of the steering wheel increases, wherein the vehicle control system further comprises a vehicle deceleration generation means configured to generate a deceleration in the vehicle, independently of a reduction of an output torque of the engine, and wherein the vehicle attitude control means is configured to generate the deceleration by means of the reduction of the output torque of the engine when an accelerator position-related value as a parameter related to a position of an accelerator pedal is equal to or greater than a given value, and to generate the deceleration by the vehicle deceleration generation means when the accelerator position-related value is less than the given value.

In the vehicle control system according to the second aspect of the present invention having the above feature, in the situation where the accelerator pedal is not depressed, the deceleration for the vehicle attitude control is also generated by the vehicle deceleration generation means, so that it is possible to perform the vehicle attitude control in the same way irrespective of whether or not the accelerator pedal is depressed, thereby preventing giving the driver a feeling of strangeness.

Preferably, in the vehicle control system according to the second aspect of the present invention, the accelerator position-related value is a parameter of the position of the accelerator pedal, wherein a state in which the accelerator position-related value is less than the given value corresponds to a state in which the accelerator pedal is at an approximately fully closed position.

According to this feature, in the situation where the accelerator position is approximately 0% (fully closed position), the deceleration for the vehicle attitude control is generated by the vehicle deceleration generation means, independently of the reduction of the output torque of the engine, so that it is possible to perform the vehicle attitude control in the same way irrespective of whether or not the accelerator pedal is depressed, thereby preventing giving the driver a feeling of strangeness.

Preferably, in the vehicle control system according to the second aspect of the present invention, when the accelerator position-related value is the given value, the output torque of the engine is less than a reduction amount of the output torque required by the vehicle attitude control means.

According to this feature, in the situation where the output torque of the engine is less than the reduction amount of the output torque required by the vehicle attitude control means, the deceleration for the vehicle attitude control is generated by the vehicle deceleration generation means, independently of the reduction of the output torque of the engine, so that it is possible to perform the vehicle attitude control in the same way irrespective of whether or not the deceleration for the vehicle attitude control can be generated by means of only the reduction of the output torque of the engine, thereby preventing giving the driver a feeling of strangeness.

Preferably, in the vehicle control system according to the second aspect of the present invention, in a situation where the deceleration is generated by the vehicle deceleration generation means, the vehicle attitude control means is configured to continue the generation of the deceleration by the vehicle deceleration generation means when the accelerator position-related value changes from less than the given value to equal to or greater than the given value.

According to this feature, even in a situation where the accelerator position-related value becomes equal to or greater than the given value, and thereby the deceleration for the vehicle attitude control becomes possible to be generated by means of only the reduction of the output torque of the engine, the generation of the deceleration by the vehicle deceleration generation means is continued, so that it is possible to suppress fluctuation of the deceleration caused by switching of a generation source of the deceleration, thereby preventing giving the driver a feeling of strangeness.

Preferably, in the vehicle control system according to the second aspect of the present invention, the vehicle attitude control means is configured to switch a generation source of the deceleration from the engine to the vehicle deceleration generation means, when the accelerator position-related value changes from equal to or greater than the given value to less than the given value, in a situation where the deceleration is generated by means of the reduction of the output torque of the engine.

According to this feature, for example, when the driver stops depressing the accelerator pedal during the vehicle attitude control by means of the reduction of the output torque of the engine, the deceleration generation source is switched from the engine to the vehicle deceleration generation means, so as to generate the deceleration for the vehicle attitude control by the vehicle deceleration generation means, so that it is possible to continue the vehicle attitude control, thereby preventing giving the driver a feeling of strangeness.

Preferably, in the vehicle control system according to the second aspect of the present invention, in a situation where the deceleration is generated by means of the reduction of the output torque of the engine, the vehicle attitude control means is configured to generate the deceleration both by means of the reduction of the output torque of the engine and by the vehicle deceleration generation means, when the accelerator position-related value becomes less than a switching threshold greater than the given value.

According to this feature, for example, when the driver stops depressing the accelerator pedal during the vehicle attitude control by means of the reduction of the output torque of the engine, the deceleration is generated by means of the reduction of the output torque of the engine, and the vehicle deceleration generation means. Thus, even in the situation where the driver stops depressing the accelerator pedal during the vehicle attitude control, the vehicle attitude control can be continued, and the reduction amount of the output torque of the engine can be gradually reduced in conformity to a rising of a deceleration generated by the vehicle deceleration generation means. This makes it possible to suppress fluctuation of the deceleration caused by switching of the generation source of the deceleration, thereby preventing giving the driver a feeling of strangeness.

Preferably, in the vehicle control system according to the first or second aspect of the present invention, when the steering angle-related value increases by turning of the steering wheel, the vehicle attitude control means is configured to generate the deceleration in the vehicle to control the vehicle attitude.

Preferably, in the vehicle control system according to the first or second aspect of the present invention, the steering angle-related value is a parameter of a steering speed of the steering wheel.

Effect of Invention

The vehicle control system of the present invention can perform the vehicle attitude control in the same way irrespective of whether or not the accelerator pedal is depressed, thereby preventing giving the driver a feeling of strangeness.

DESCRIPTION OF EMBODIMENTS

Figure 1:
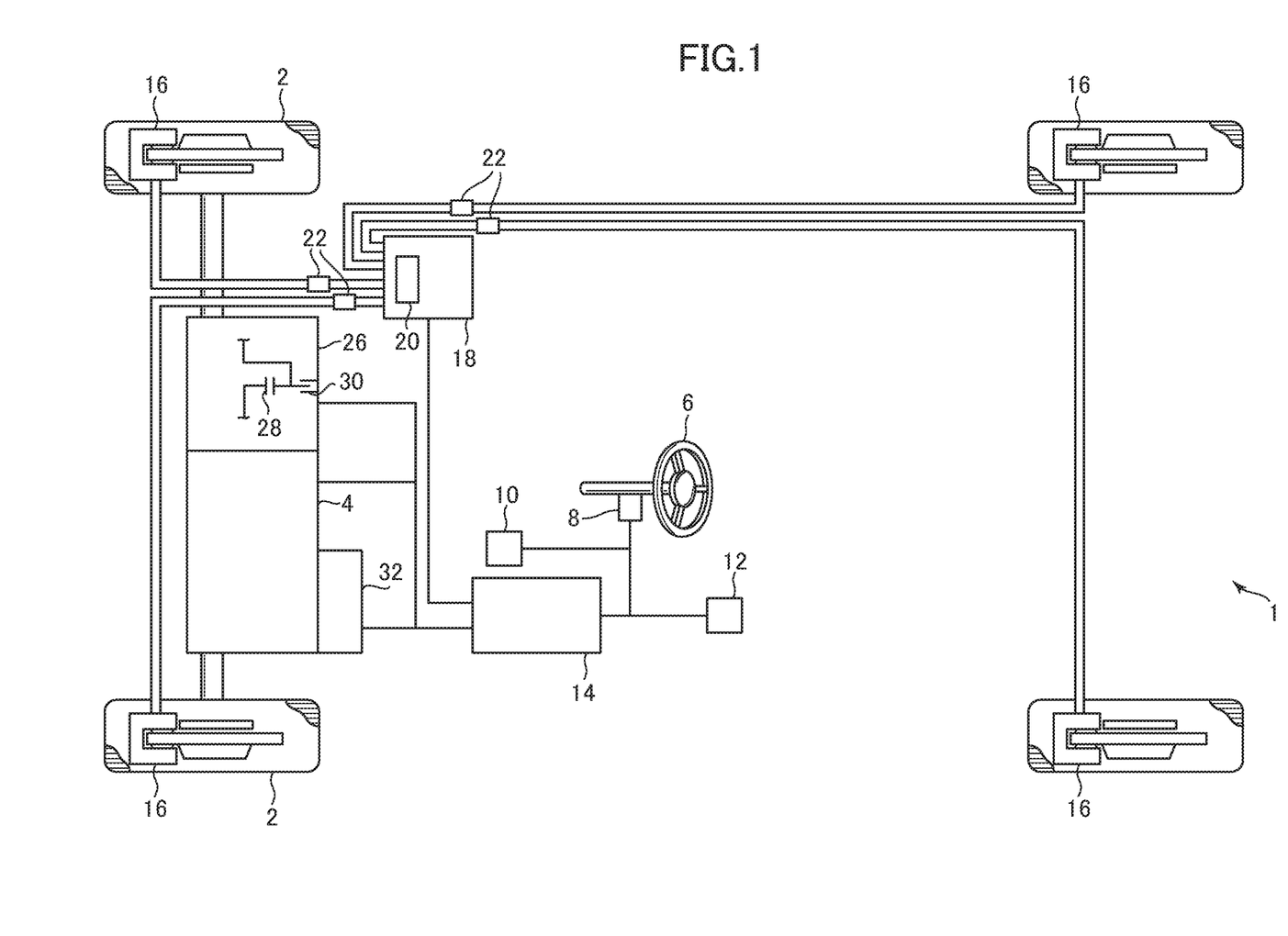
FIG. 1 is a block diagram showing the overall configuration of a vehicle equipped with a vehicle control system according to the embodiment of the present invention.

With reference to the accompanying drawings, a vehicle control system according to each of first and second embodiments of the present invention will now be described.
<System Configuration>
FIG. 1 is a block diagram showing an overall system configuration of the vehicle equipped with the vehicle control system according to the first or second embodiment.

In FIG. 1, the reference sign 1 denotes the vehicle equipped with the vehicle control system according to the first or second embodiment. A vehicle body of the vehicle 1 has a front portion on which an engine 4 serving as a driving force source for driving drive road wheels (in the example illustrated in FIG. 1, right and left front road wheels 2) is mounted. The engine 4 is an internal combustion engine such as a gasoline engine or a diesel engine. In the first and second embodiments, the engine 4 is a gasoline engine having a spark plug.

The vehicle 1 is equipped with a steering angle sensor 8 for detecting a rotational angle (steering angle) of a steering shaft (not shown) coupled to a steering wheel 6 and supported in a steering column (not shown); an accelerator position sensor 10 for detecting the position (relative position) of an accelerator pedal (accelerator position); and a vehicle speed sensor 12 for detecting a vehicle speed. Each of the above sensors is operable to output a detection value to a PCM (Power-train Control Module) 14.

The vehicle 1 is further equipped with a brake control system 18 for supplying a brake hydraulic pressure to a wheel cylinder or a brake caliper of a brake unit 16 installed in each of four road wheels. The brake control system 18 comprises a hydraulic pump 20 operable to generate a brake hydraulic pressure necessary to generate a braking force in the brake unit 16 installed in each of the road wheels. The hydraulic pump 20 is configured to be driven by electric power supplied from, e.g., a battery (not shown), so as to generate a brake hydraulic pressure necessary to generate a braking force in each of the brake units 16, even when a brake pedal is not depressed. The brake control system 18 further comprises a valve unit 22 (specifically, solenoid valve) provided in a hydraulic pressure supply line connected to the brake unit 16 in each of the road wheels and operable to control a hydraulic pressure to be supplied from the hydraulic pump 20 to the brake unit 16 in each of the road wheels. For example, the degree of opening of each of the valve units 22 can be changed by adjusting an amount of electric power to be supplied from the battery to each of the valve units 22.

The brake control system 18 is operable, based on a braking force instruction value input from the PCM 14, to calculate a hydraulic pressure to be independently supplied to the wheel cylinder or the brake caliper in each of the road wheels, and control a pump speed of the hydraulic pump 20 and the degree of opening of each of the valve units 22, according to the calculated hydraulic pressure. The brake units 16 and the brake control system 18 function as "vehicle deceleration generation means" as set forth in the appended claims.

Figure 2:
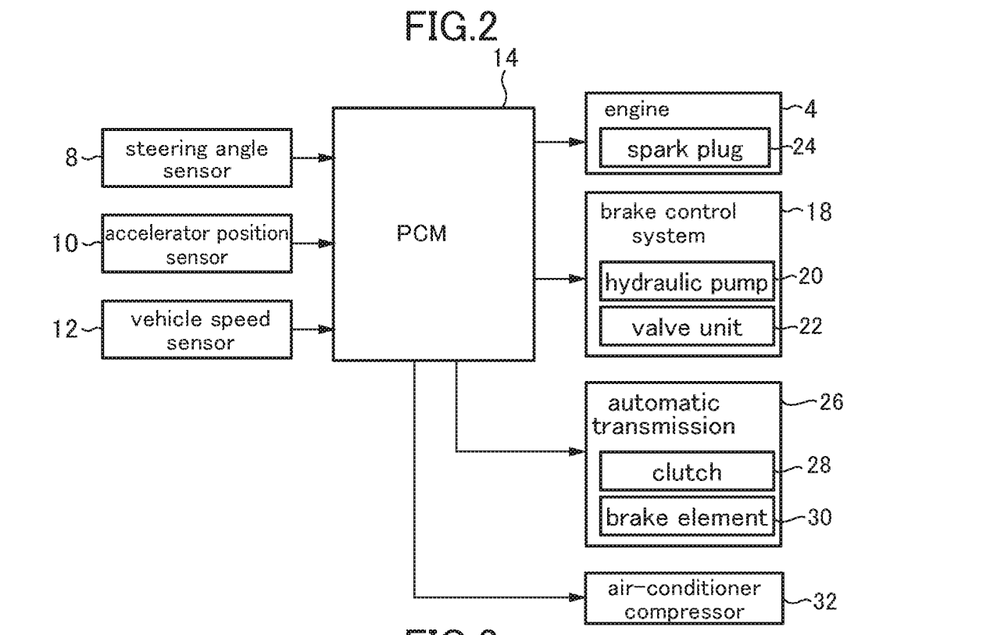
FIG. 2 is a block diagram showing an electrical configuration of the vehicle control system according to the embodiment.

Next, with reference to FIG. 2, an electrical configuration of the vehicle control system according to the first or second embodiment will be described. FIG. 2 is a block diagram showing the electrical configuration of the vehicle control system according to the first or second embodiment.

In the vehicle control system according to the first or second embodiment, the PCM 14 (controller) is operable, based on detection signals from the aforementioned sensors 8, 10, 12, and detection signals output from various other sensors for detecting an operating state of the engine 4, to output control signals in order to perform control with respect to various components (such as a throttle valve, a turbocharger, a variable valve mechanism, an ignition device, a fuel injection valve, and an EGR device) of the engine 4.

The PCM 14 are composed of a computer which comprises: one or more processors; various programs (including a basic control program such as an OS, and an application program capable of being activated on the OS to realize a specific function) to be interpreted and executed by the one or more processors; and an internal memory such as ROM or RAM for storing therein the programs and a variety of data.

The PCM 14 is equivalent to "controller" in the vehicle control system, and functions as a "vehicle attitude control means", as set forth in the appended claims, although details thereof will be described later.

<Control Content in each Embodiment>

Next, the content of specific control to be executed by the vehicle control system will be described.

Figure 3:
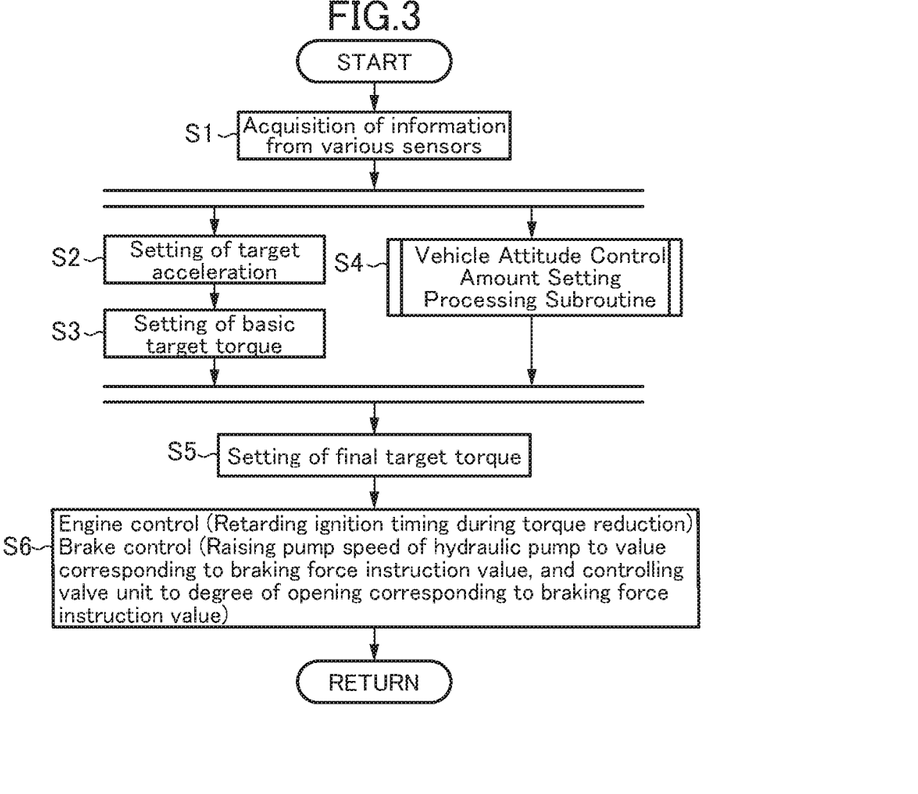
FIG. 3 is a flowchart of an attitude control processing routine in the vehicle control system according to the embodiment.

First of all, an overall flow of an attitude control processing routine to be executed by the vehicle control system according to the first or second embodiment will be described based on FIG. 3. FIG. 3 is a flowchart of the attitude control processing routine in the vehicle control system according to the first or second embodiment.

The attitude control processing routine in FIG. 3 is activated when an ignition switch of the vehicle 1 is turned on and thus electric power is applied to the vehicle control system, and repeatedly executed with a given period (e.g., 50 ms).

As shown in FIG. 3, upon start of the attitude control processing routine, the PCM 14 operates, in step S1, to acquire a variety of information regarding a driving state of the vehicle 1. Specifically, the PCM 14 operates to acquire, as the information regarding the driving state, detection signals output from the aforementioned various sensors, including the steering angle detected by the steering angle sensor 8, the accelerator position detected by the accelerator position sensor 10, the vehicle speed detected by the vehicle speed sensor 12, a gear stage currently set in a transmission of the vehicle 1, etc.

Subsequently, in step S2, the PCM 14 operates to set a target acceleration, based on the driving state of the vehicle 1 acquired in the step S1 and including manipulation of the accelerator pedal. Specifically, the PCM 14 operates to select, from a plurality of acceleration characteristic maps defined with respect to various values of the vehicle speed and various gear stages (the maps are preliminarily created and stored in a memory or the like), one acceleration characteristic map corresponding to a current value of the vehicle speed and a current one of the gear stages, and set as a target acceleration corresponding to a current value of the accelerator position, with reference to the selected acceleration characteristic map.

Subsequently, in step S3, the PCM 14 operates to set a basic target torque of the engine 4 for realizing the target acceleration set in the step S2. In this process, the PCM 14 operates to set the basic target torque within a torque range outputtable by the engine 4, based on current values of the vehicle speed, a road grade and a road surface µ, a current one of the gear stages, etc.

In parallel to the processings in the steps S2 and S3, in step S4, the PCM 14 operates to execute a vehicle attitude control amount setting processing subroutine to set, based on a parameter related to the steering angle (steering angle-related value), a vehicle attitude control amount (specifically, a torque reduction amount, and a braking force) necessary to generate a deceleration in the vehicle 1. The first and second embodiments will be described on the assumption that the steering angle is used as the steering angle-related value. The details of the vehicle attitude control amount setting processing subroutine will be described later.

Subsequently, in step S5, the PCM 14 operates to set a final target torque, based on the basic target torque set in the step S3, and the torque reduction amount set in the step S4.

Subsequently, in step S6, the PCM 14 operates to control the engine 4 to cause the engine 4 to output the final target torque set in the step S5. Specifically, based on the final target torque set in the step S5 and an engine speed, the PCM 14 operates to set various state amounts (e.g., air charge amount, fuel injection amount, intake-air temperature, and oxygen concentration) necessary to realize the final target torque, and then, based on the set state amounts, control a plurality of actuators each to drive a respective one of the components of the engine 4. In this case, before executing the control, the PCM 14 operates to, set a limit value or range with respect to each of the state amounts, and set a control amount for each actuator to allow its related state amount to preserve limitation by the limit value or range.

More specifically, assuming that the engine 4 is a gasoline engine, when setting the final target torque by subtracting the torque reduction amount from the basic target torque, the PCM 14 operates to retard an ignition timing of the spark plug 24 with respect to a point to be set when the basic target torque is directly set as the final target torque, thereby reducing an output torque of the engine 4.

On the other hand, assuming that the engine 4 is a diesel engine, when setting the final target torque by subtracting the torque reduction amount from the basic target torque, the PCM 14 operates to reduce a fuel injection amount with respect to a value to be set when the basic target torque is directly set as the final target torque, thereby reducing the output torque of the engine 4.

Further, the PCM 14 operates to control the brake units 16 to generate the braking force set in the step S4. Specifically, the PCM 14 operates to output a braking force instruction value set based on the braking force set in the step S4, to the brake control system 18.

As one example, the brake control system 18 preliminarily stores a map defining a relationship between the braking force instruction value and the pump speed of the hydraulic pump 20, and operates the hydraulic pump 20 at a pump speed corresponding to the received braking force instruction value, while referring to the map (e.g., electric power to be supplied to the hydraulic pump 20 is increased to raise the pump speed of the hydraulic pump 20 to a value corresponding to the received braking force instruction value).

Further, the brake control system 18 preliminarily stores another map defining a relationship between the braking force instruction value and the degree of opening of each of the valve units 22, and control each of the valve units 22 to have the degree of opening corresponding to the received braking force instruction value, while referring to the map (e.g., electric power to be supplied to each of the solenoid valves is increased to increase the degree of opening of the solenoid valve to a value corresponding to the received braking force instruction value).

After the step S6, the PCM 14 completes one cycle of the attitude control processing routine.

First Embodiment

Next, with reference to FIGS. 4 and 5, the vehicle attitude control amount setting processing subroutine in the vehicle control system according to the first embodiment will be described in detail.

Figure 4:
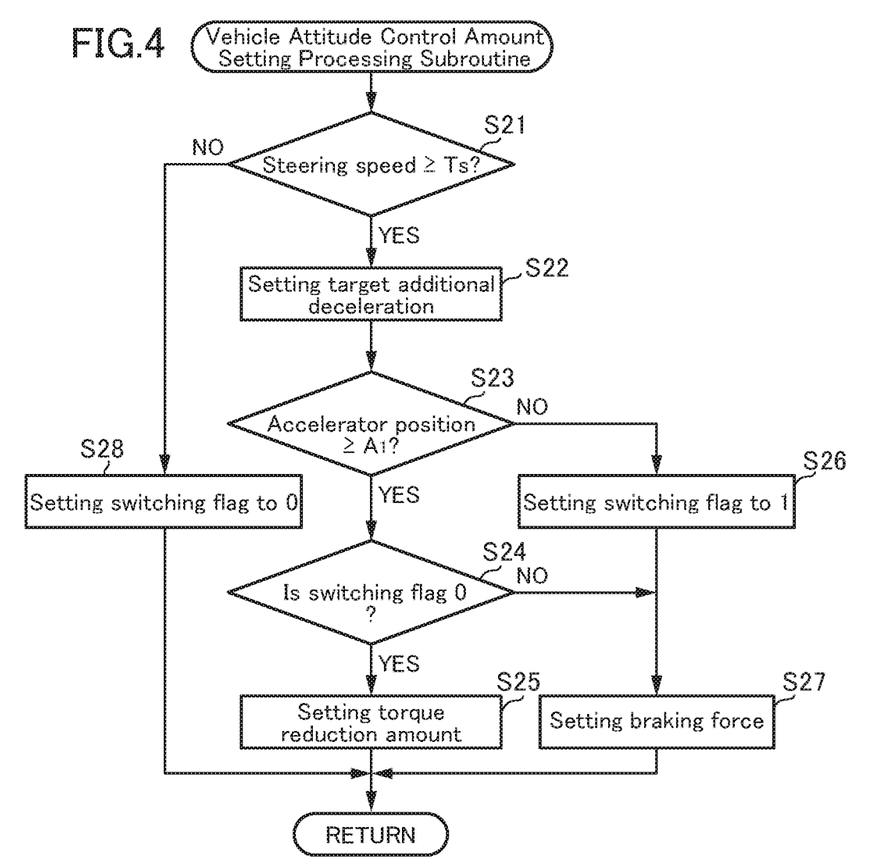
FIG. 4 is a flowchart of a vehicle attitude control amount setting processing subroutine in the vehicle control system according to the first embodiment of the present invention.
Figure 5:
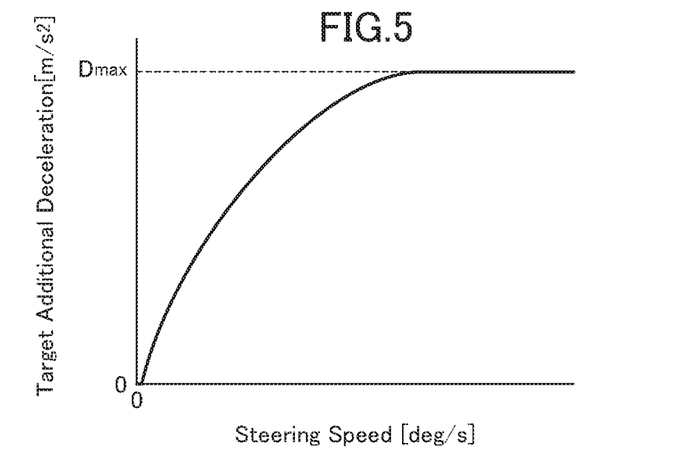
FIG. 5 is a map, in the vehicle control system according to the first embodiment, showing a relationship between a target additional deceleration and a steering speed.

FIG. 4 is a flowchart of the vehicle attitude control amount setting processing subroutine in the vehicle control system according to the first embodiment, and FIG. 5 is a map showing a relationship between a target additional deceleration and a steering speed, in the vehicle control system according to the first embodiment.

Upon start of the vehicle attitude control amount setting processing subroutine, the PCM 14 operates, in step S21, to determine whether or not a steering speed (the rate of change of the steering angle acquired in, e.g., the step S1) is equal to or greater than a given value $T_S$. Here, the state in which the steering speed is equal to or greater than the given value $T_S$ means that the turning manipulation of the steering wheel is being performed.

As a result of this determination, when the steering speed is equal to or greater than the given value $T_S$, the subroutine proceeds to step S22. In the step S22, the PCM 14 operates to set a target additional deceleration, based on the steering speed. This target additional deceleration means a deceleration to be added to the vehicle in response to the steering manipulation, so as to control the vehicle attitude in conformity to the intention of a driver.

Basically, the PCM 14 operates to, based on the relationship between the target additional deceleration and the steering speed as shown in the map of FIG. 5, acquire a value of the target additional deceleration corresponding to a current value of the steering speed. In FIG. 5, the horizontal axis represents the steering speed, and the vertical axis represents the target additional deceleration. As shown in FIG. 5, as the steering speed becomes larger, the target additional deceleration corresponding to the steering speed gradually comes closer to a given upper limit (e.g., 0.5 m/s2). Specifically, as the steering speed becomes larger, the target additional deceleration gradually increases, and the rate of increase of the target additional deceleration gradually decreases.

Subsequently, in step S23, the PCM 14 operates to determine whether or not an accelerator position-related value as a parameter related to the position of the accelerator pedal is equal to or greater than a given value. Here, as the accelerator position-related value, it is possible to use: a value of the accelerator position detected by the accelerator position sensor 10; a value corresponding to an intake amount, such as an intake-air amount detected by a non-illustrated airflow sensor, the degree of opening of the throttle valve detected by a non-illustrated throttle valve opening sensor, or a valve closing timing of an intake valve; or a degree of opening of a valve corresponding to an engine load, such as a fuel injection amount of the fuel injection valve, or an ignition timing advance amount of the spark plug 24.

The first and second embodiments will be described on the assumption that the PCM 14 uses the accelerator position detected by the accelerator position sensor 10. That is, in the step S23, the PCM 14 operates to determine whether or not the accelerator position is equal to or greater than a given value $A_1$. For example, the given value $A_1$ is a value of the accelerator position as measured when the driver places his/her foot on the accelerator pedal but has no intention of depressing the accelerator pedal any more. The output torque of the engine 4 to be generated when the accelerator position is at the given value $A_1$ is approximately the same as an idling torque Ti, and is less than the torque reduction amount (i.e., a reduction amount of the output torque to be instructed to the engine 4) to be set for the vehicle attitude control by the PCM 14.

As a result of this determination, when the accelerator position is equal to or greater than the given value $A_1$, the subroutine proceeds to step S24. In the step S24, the PCM 14 operates to determine whether or not a switching flag indicative of a record of the accelerator position during the vehicle attitude control is 0. The switching flag is initially set to 0, and then set to 1 when the accelerator position is or becomes less than the given value $A_1$ at start of the vehicle attitude control or during the vehicle attitude control (specifically, during a period after the steering speed becomes equal to or greater than the given value $T_S$ through until the steering speed becomes less than the given value $T_S$.

As a result of the determination in the step S24, when the switching flag is 0, i.e., when the accelerator position is not less than the given value $A_1$ at start of the vehicle attitude control or during the vehicle attitude control, the subroutine proceeds to step S25. In the step S25, the PCM 14 operates to set the torque reduction amount, based on the target additional deceleration set in the step S22. Specifically, the PCM 14 operates to set the torque reduction amount necessary to realize the target additional deceleration by means of reduction of the output torque of the engine 4, based on current values of the vehicle speed and the road grade, a current one of the speed stages, etc., acquired in the step S1.

On the other hand, as a result of the determination in the step S23, when the accelerator position is less than the given value $A_1$, the subroutine proceeds to step S26. In the step S26, the PCM 14 operates to set the switching flag to 1. Subsequently, in step S27, the PCM 14 operates to, based on the target additional deceleration set in the step S22, set the braking force to be instructed to the brake units 16. Specifically, the PCM 14 operates to set the braking force necessary to realize the target additional deceleration by means of the braking force of the brake units 16 independently of the reduction of the output torque of the engine 4, based on current values of the vehicle speed and the road grade, etc., acquired in the step S1.

On the other hand, as a result of the determination in the step S24, when the switching flag is not 0 (the switching flag is 1), the subroutine proceeds to the step S27. In the step S27, the PCM 14 operates to, based on the target additional deceleration set in the step S22, set the braking force to be instructed to the brake units 16. Specifically, when the accelerator position changes from less than the given value $A_1$ to equal to or greater than the given value $A_1$, in a situation where the deceleration is generated by the brake units 16 because the accelerator position is less than the given value $A_1$, the PCM 14 operates to continue the generation of the deceleration by the brake units 16.

On the other hand, as a result of the determination in the step S21, when the steering speed is less than the given value $T_S$, the subroutine proceeds to step S28. In the step S28, the PCM 14 operates to set the switching flag to 0. In this situation, the PCM 14 operates to keep from executing the vehicle attitude control.

After the step S25, S27 or S28, the PCM 14 completes the vehicle attitude control amount setting processing subroutine, and returns to the main routine.

Figure 6:
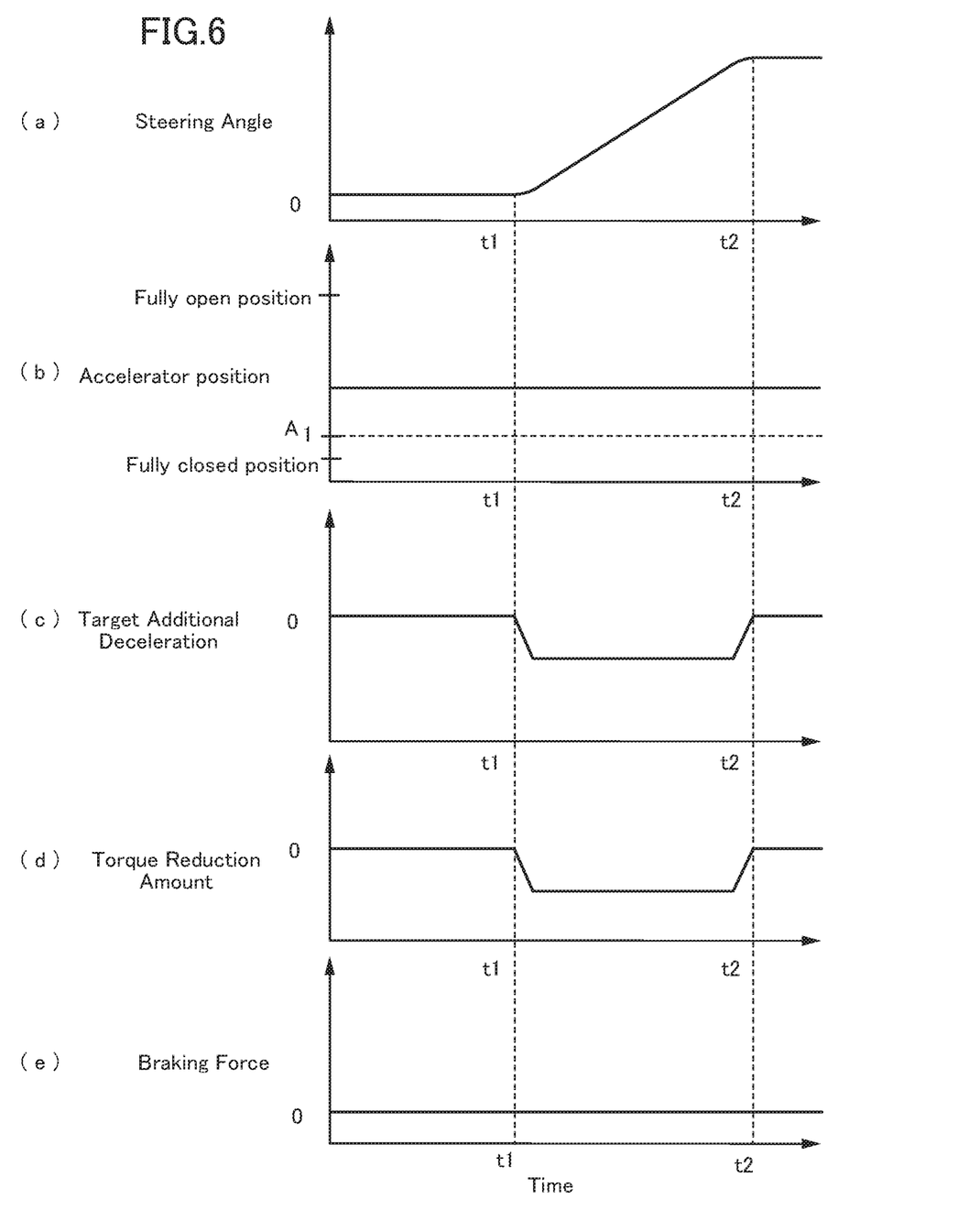
FIG. 6 is time charts each showing a temporal change in a respective one of plural parameters regarding vehicle attitude control, as measured when a vehicle equipped with the vehicle control system according to the first embodiment is turning, wherein an accelerator position is equal to or greater than a given value.
Figure 7:
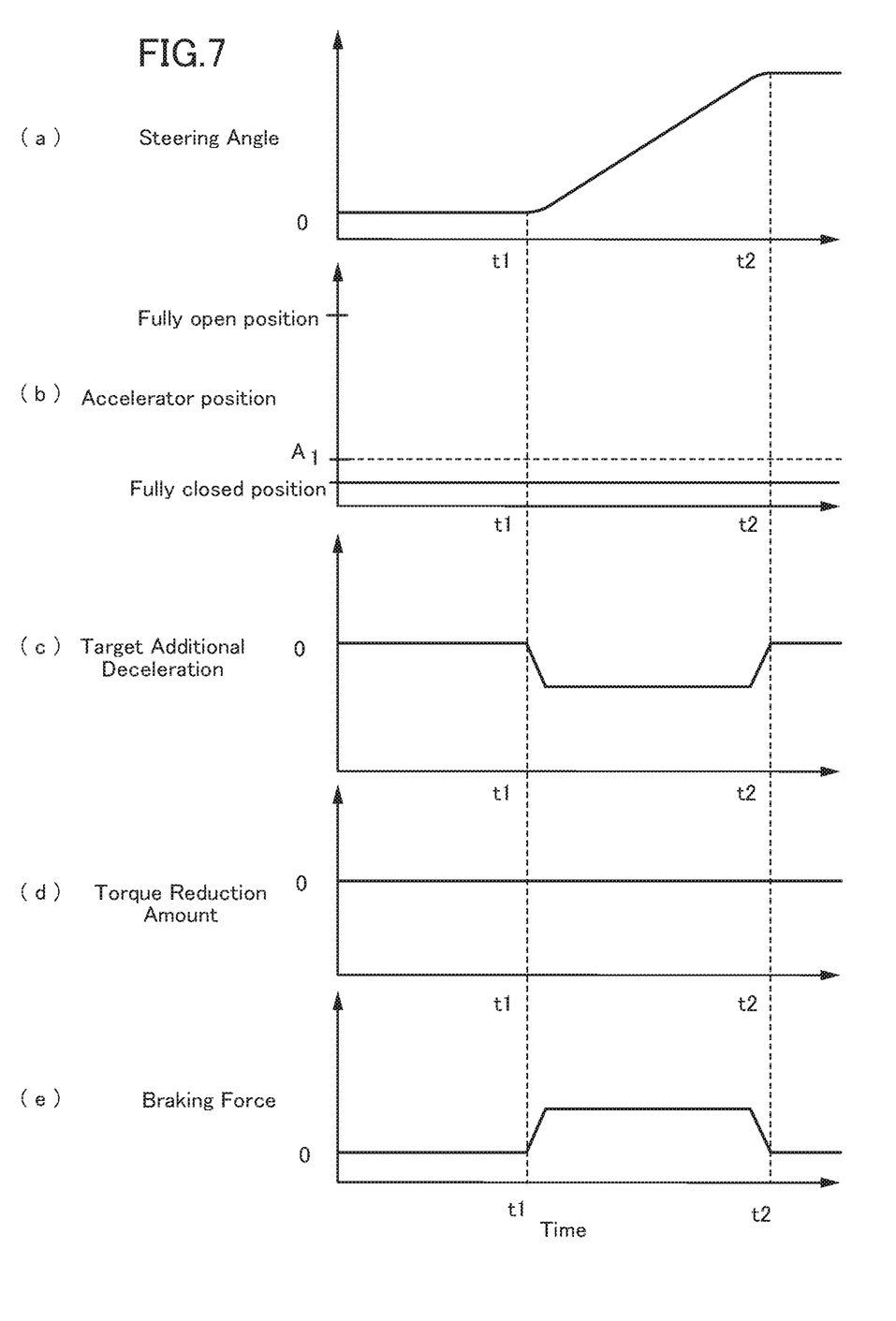
FIG. 7 is time charts each showing a temporal change in a respective one of the parameters regarding the vehicle attitude control, as measured when the vehicle equipped with the vehicle control system according to the first embodiment is turning, wherein the accelerator position is less than the given value.
Figure 8:
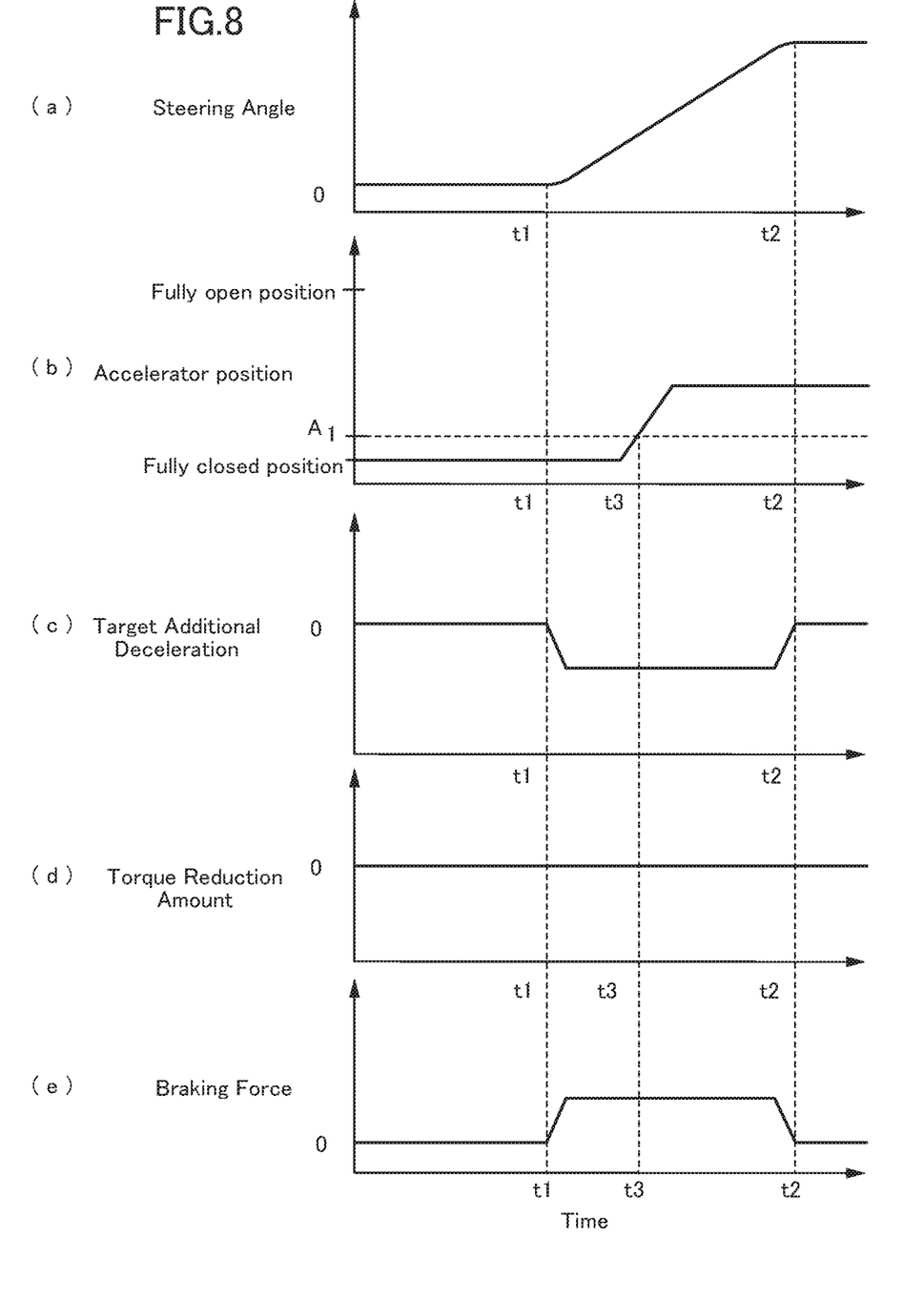
FIG. 8 is time charts each showing a temporal change in a respective one of the parameters regarding the vehicle attitude control, as measured when the vehicle equipped with the vehicle control system according to the first embodiment is turning, wherein, during the vehicle attitude control, the accelerator position changes from less than the given value to equal to or greater than the given value.
Figure 9:
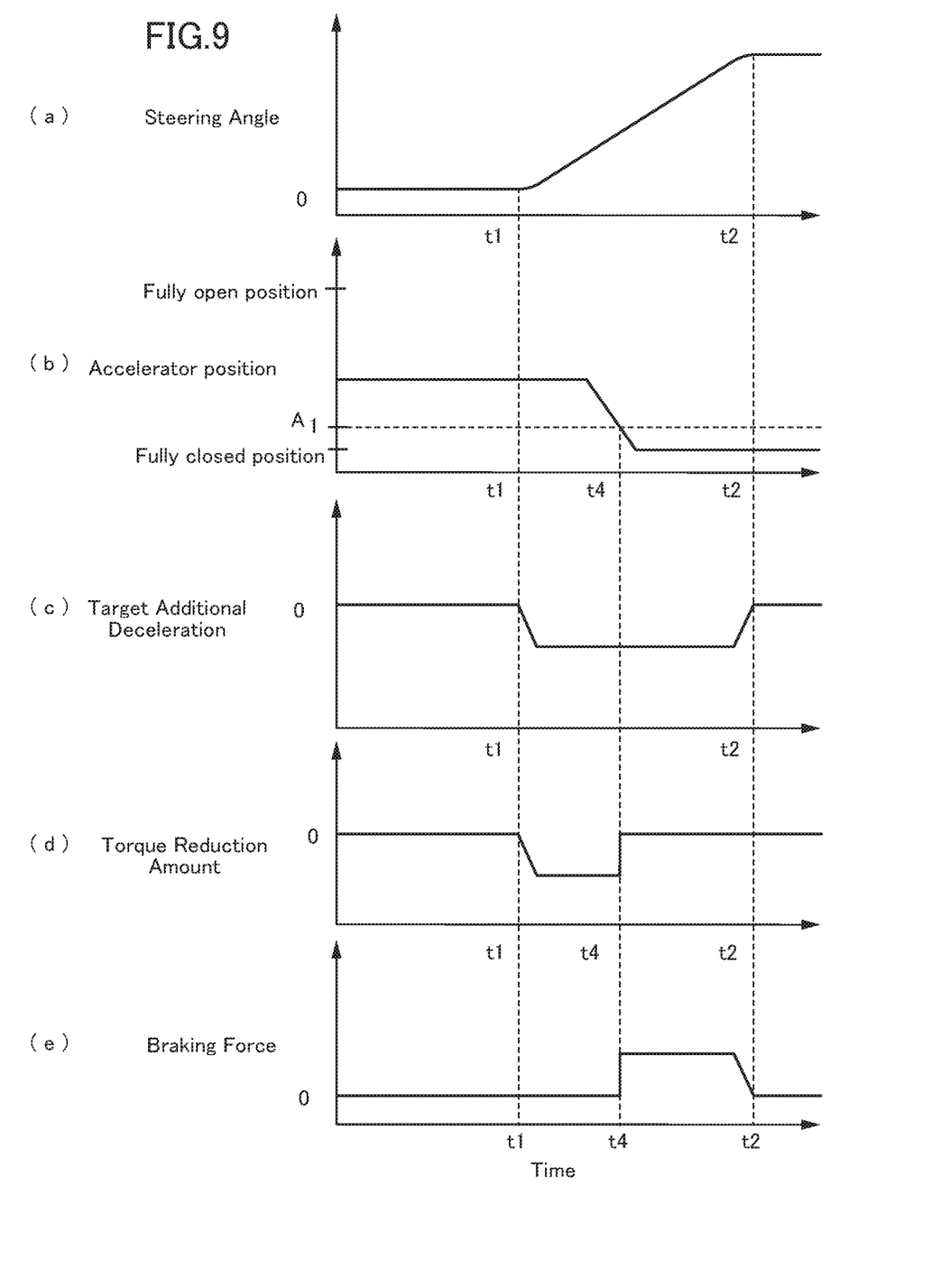
FIG. 9 is time charts each showing a temporal change in a respective one of the parameters regarding the vehicle attitude control, as measured when the vehicle equipped with the vehicle control system according to the first embodiment is turning, wherein, during the vehicle attitude control, the accelerator position changes from equal to or greater than the given value to less than the given value.

Next, with reference to FIGS. 6 to 9, the operation of the vehicle control system according to the first embodiment will be described. Each of FIGS. 6 to 9 is time charts each showing a temporal change in a respective one of plural parameters regarding the vehicle attitude control, as measured when the vehicle equipped with the vehicle control system according to the first embodiment is turning. In particular, FIG. 6 shows a case where the accelerator position is equal to or greater than the given value, and FIG. 7 shows a case where the accelerator position is less than the given value. Further, FIG. 8 shows a case where, during the vehicle attitude control, the accelerator position changes from less than the given value to equal to or greater than the given value, and FIG. 9 shows a case where, during the vehicle attitude control, the accelerator position changes from equal to or greater than the given value to less than the given value. In each of FIGS. 6 to 9, (a), (b) and (c) are, respectively, a chart showing a change in the steering angle as measured when the vehicle is turning, a chart showing a change in the accelerator position, and a chart showing a change in the target additional deceleration set based on the steering speed, and (d) and (e) are, respectively, a chart showing a change in the torque reduction amount set through the vehicle attitude control amount setting processing subroutine, and a chart showing a change in the braking force set through the vehicle attitude control amount setting processing subroutine.

As shown in the chart (a) in FIG. 6, when the steering angle increases at a steering speed of equal to or greater than the given value $T_S$ in the period from time t1 to time t2, the target additional deceleration is set through the vehicle attitude control amount setting processing subroutine executed by the PCM 14, as shown in the chart (c). In this process, when the accelerator position is maintained equal to or greater than the given value $A_1$, as shown in the chart (b), the PCM 14 operates to generate a deceleration in the vehicle 1 by means of the reduction of the output torque of the engine 4. Specifically, as shown in the chart (d), the PCM 14 operates to set the torque reduction amount necessary to realize the target additional deceleration set based on the steering speed. In this case, the braking force for the vehicle attitude control is kept at 0, as shown in the chart (e).

On the other hand, as shown in the chart (b) in FIG. 7, when the accelerator position is maintained less than the given value $A_1$, the PCM 14 operates to generate a deceleration in the vehicle 1 by means of the braking force of the brake units 16, instead of the reduction of the output torque of the engine 4. Specifically, as shown in the chart (e) in FIG. 7, the PCM 14 operates to set the braking force necessary to realize the target additional deceleration set based on the steering speed. In this case, the torque reduction amount for the vehicle attitude control is kept at 0, as shown in the chart (d) in FIG. 7.

Further, as shown in the chart (b) in FIG. 8, when the accelerator position is at a fully closed position (i.e., less than the given value $A_1$) at the time t1, and subsequently increases to become equal to or greater than the given value $A_1$ from time t3, the PCM 14 operates, until the time t3, to set the braking force necessary to realize the target additional deceleration and generate a deceleration in the vehicle 1 by the brake units 16, as shown in the chart (e) in FIG. 8, in the same manner as that in FIG. 7. After the time t3, the PCM 14 also operates to continue to set the braking force necessary to realize the target additional deceleration and generate the deceleration by the brake units 16. In this case, the torque reduction amount for the vehicle attitude control is kept at 0 even after the time t3, as shown in the chart (d) in FIG. 8.

On the other hand, as shown in the chart (b) in FIG. 9, when the accelerator position is equal to or greater than the given value $A_1$ at the time t1, and subsequently decreases to become less than the given value $A_1$ from time t4, the PCM 14 operates, until the time t4, to set the torque reduction amount necessary to realize the target additional deceleration and generate a deceleration in the vehicle 1 by means of the reduction of the output torque of the engine 4, as shown in the charts (d) and (e) in FIG. 8, in the same manner as that in FIG. 6. Then, when the accelerator position changes at the time t4 from equal to or greater than the given value $A_1$ to less than the given value $A_1$, the PCM 14 operates to set the torque reduction amount to 0 (i.e., to stop the reduction of the production torque of the engine 4) and to set the braking force necessary to realize the target additional deceleration and generate a deceleration in the vehicle 1 by the brake devices 16. That is, a generation source of the deceleration is switched from the reduction of the output torque of the engine 4 to the breaking force of the brake device 16.

As above, in the vehicle control system according to the first embodiment, when the accelerator position is equal to or greater than the given value $A_1$, the deceleration for the vehicle attitude control is generated by means of the reduction of the output torque of the engine 4, and, when the accelerator position is less than the given value $A_1$, the deceleration for the vehicle attitude control is generated by means of the braking force of the brake units 16. That is, even in the situation where the accelerator pedal is not depressed, the deceleration for the vehicle attitude control is generated by means of the braking force of the brake units 16, so that it is possible to perform the vehicle attitude control in the same way irrespective of whether or not the accelerator pedal is depressed, thereby preventing giving the driver a feeling of strangeness.

In the vehicle control system according to the first embodiment, when the accelerator position changes from less than the given value $A_1$ to equal to or greater than the given value $A_1$, in a situation where the deceleration for the vehicle attitude control is generated by the brake units 16, the PCM 14 operates to continue the generation of the deceleration by means of the braking force of the brake units 16, so that it is possible to suppress fluctuation of the deceleration caused by switching of the generation source of the deceleration, thereby preventing giving the driver a feeling of strangeness.

In the vehicle control system according to the first embodiment, when the accelerator position changes from equal to or greater than the given value $A_1$ to less than the given value $A_1$, in a situation where the deceleration for the vehicle attitude control is generated by means of the reduction of the output torque of the engine 4, the PCM 14 operates to switch the generation source of the deceleration from the reduction of the output torque of the engine 4 to the braking force of the brake units 16, so that it is possible to continue the vehicle attitude control even in a situation where the driver stops depressing the accelerator pedal during the vehicle attitude control, thereby preventing giving the driver a feeling of strangeness.

Second Embodiment

Figure 10:
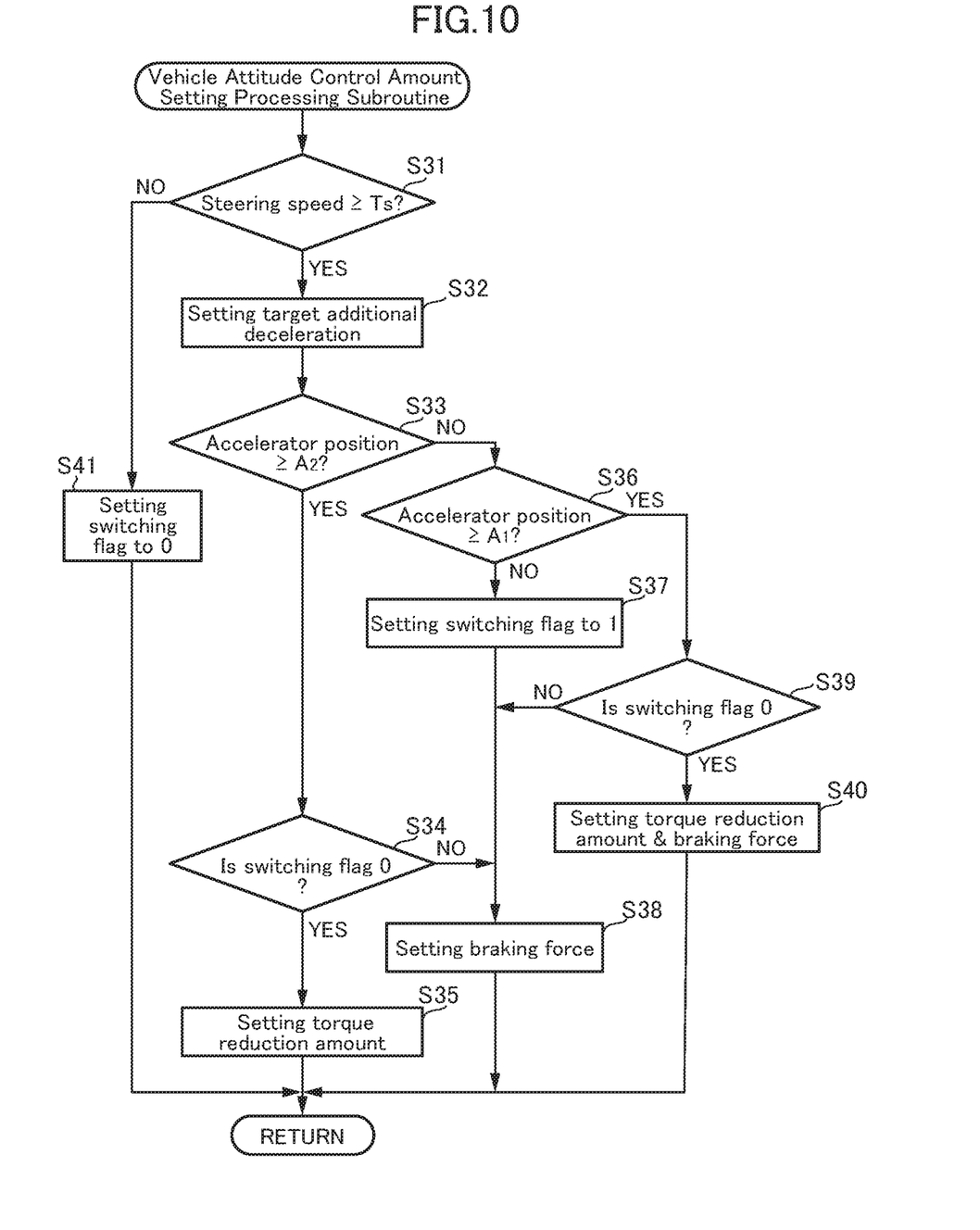
FIG. 10 is a flowchart of a vehicle attitude control amount setting processing subroutine in the vehicle control system according to the second embodiment of the present invention.
Figure 11:
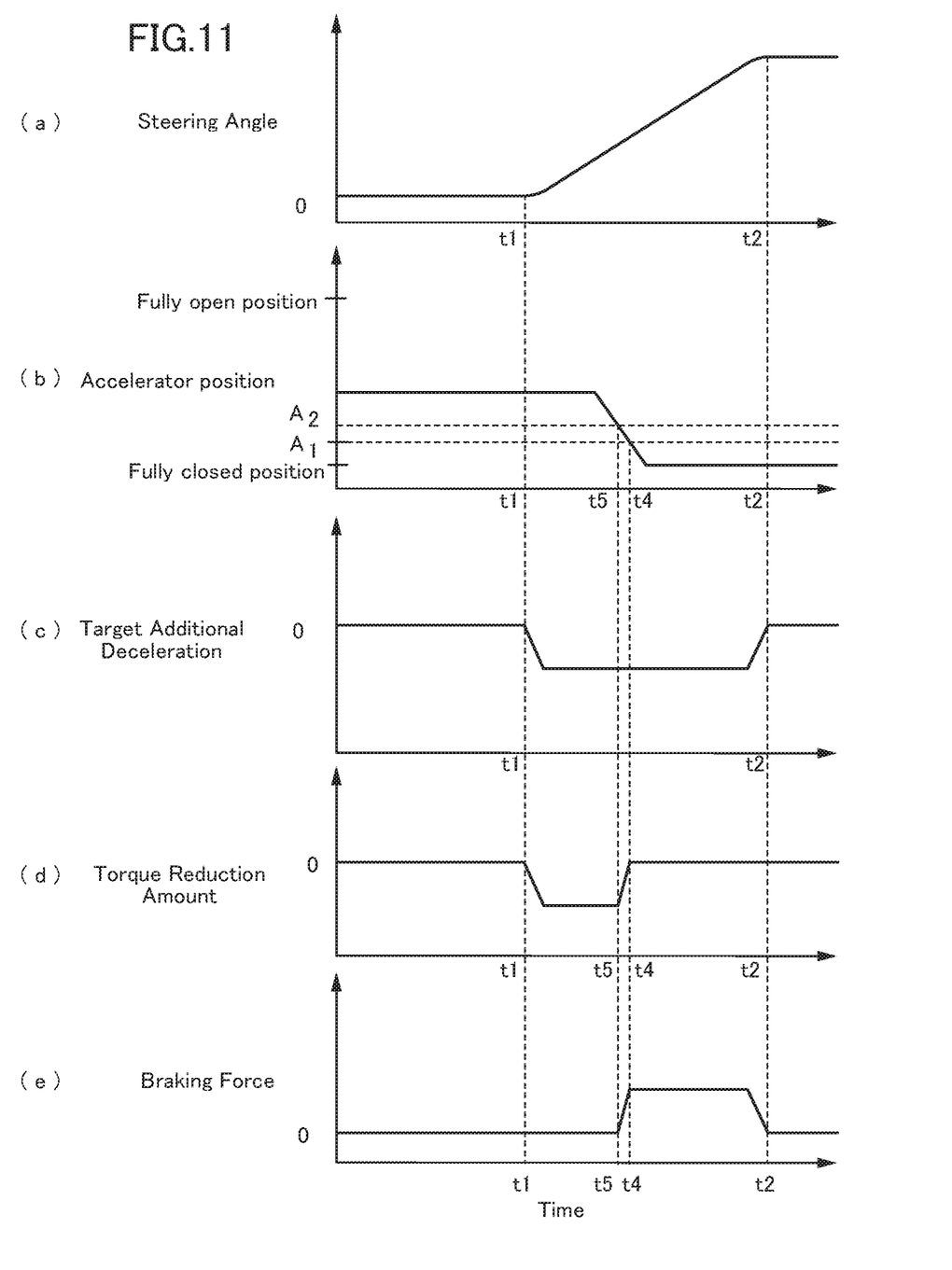
FIG. 11 is time charts each showing a temporal change in a respective one of the parameters regarding the vehicle attitude control, as measured when a vehicle equipped with the vehicle control system according to the second embodiment is turning, wherein, during the vehicle attitude control, the accelerator position changes from equal to or greater than the given value to less than the given value.

Next, with reference to FIGS. 10 and 11, the vehicle control system according to the second embodiment will be described in detail. FIG. 10 is a flowchart of the vehicle attitude control amount setting processing subroutine in the vehicle control system according to the second embodiment, and FIG. 11 is time charts each showing a temporal change in a respective one of the parameters regarding the vehicle attitude control, wherein, during the vehicle attitude control, the accelerator position is changed from equal to or greater than the given value to less than the given value. A part of the configuration of the second embodiment is the same as that in the first embodiment, and detailed description of such a part will be omitted.

Firstly, the vehicle attitude control amount setting processing subroutine in the second embodiment will be described. Steps S31 and S32 in the vehicle attitude control amount setting processing subroutine in the second embodiment are the same as the steps S21 and S22 in the vehicle attitude control amount setting processing subroutine in the first embodiment illustrated in FIG. 4.

After completion of the processing in the step S32, in step S33, the PCM 14 operates to determine whether or not the accelerator position-related value as a parameter related to the position of the accelerator pedal is equal to or greater than a given threshold. Specifically, the PCM 14 operates to determine whether or not the accelerator position is equal to or greater than a threshold $A_2$ greater than the given value $A_1$.

As a result of this determination, when the accelerator position is equal to or greater than the threshold $A_2$, the subroutine proceeds to step S34. In the step S34, the PCM 14 operates to determine whether or not a switching flag indicative of a record of the accelerator position during the vehicle attitude control is 0. The switching flag is initially set to 0, and then set to 1 when the accelerator position is or becomes less than the given value $A_1$ at start of the vehicle attitude control or during the vehicle attitude control (specifically, during a period after the steering speed becomes equal to or greater than the given value $T_S$ through until the steering speed becomes less than the given value $T_S$.

As a result of the determination in the step S34, when the switching flag is 0, i.e., when the accelerator position is not less than the given value $A_1$ at start of the vehicle attitude control or during the vehicle attitude control, the subroutine proceeds to step S35. In the step S35, the PCM 14 operates to set the torque reduction amount, based on the target additional deceleration set in the step S32.

On the other hand, as a result of the determination in the step S33, when the accelerator position is less than the threshold $A_2$, the subroutine proceeds to step S36. In the step S36, the PCM 14 operates to determine whether or not the accelerator position is equal to or greater than the given value $A_1$. As a result of this determination, when the accelerator position is less than the given value $A_1$, the subroutine proceeds to step S37. In the step S37, the PCM 14 operates to set the switching flag to 1. Subsequently, in step S38, the PCM 14 operates to, based on the target additional deceleration set in the step S32, set the braking force to be instructed to the brake units 16.

Further, as a result of the determination in the step S34, when the switching flag is not 0 (the switching flag is 1), the subroutine proceeds to the step S38. In the step S38, the PCM 14 operates to, based on the target additional deceleration set in the step S32, set the braking force to be instructed to the brake units 16. Specifically, when the accelerator position changes to become equal to greater than the threshold $A_2$, in a situation where the deceleration is generated by the brake units 16 because the accelerator position is less than the given value $A_1$, the PCM 14 operates to continue the generation of the deceleration by the brake units 16.

On the other hand, as a result of the determination in the step S36, when the accelerator position is equal to or greater than the given value $A_1$, the subroutine proceeds to step S39. In the step S39, the PCM 14 operates to determine whether or not the switching flag is 0. As a result of this determination, when the switching flag is not 0 (the switching flag is 1), the subroutine proceeds to the step S38. In the step S38, the PCM 14 operates to, based on the target additional deceleration set in the step S32, set the braking force to be instructed to the brake units 16. Specifically, when the accelerator position changes to become equal to or greater than the given value $A_1$, in a situation where the deceleration is generated by the brake units 16 because the accelerator position is less than the given value $A_1$, the PCM 14 operates to continue the generation of the deceleration by the brake units 16.

On the other hand, as a result of the determination in the step S39, when the switching flag is 0, i.e., when the accelerator position is not less than the given value $A_1$ at start of the vehicle attitude control or during the vehicle attitude control, the subroutine proceeds to step S40. In the step S40, the PCM 14 operates to, based on the target additional deceleration set in the step S32, set the torque reduction amount to be instructed to the engine 4, and the braking force to be instructed to the brake units 16. Specifically, the PCM 14 operates to set the torque reduction amount and the braking force such that the sum of a deceleration by means of the torque reduction amount and a deceleration by means of the braking force becomes equal to the target additional deceleration. The allocation between the torque reduction amount and the braking force may be set by any of various techniques. For example, the PCM 14 may be configured to set the torque reduction amount and the braking force such that the torque reduction amount is gradually reduced and the braking force is gradually increased, as the accelerator position becomes smaller.

Further, as a result of the determination in the step S31, when the steering speed is less than the given value $T_S$, the subroutine proceeds to step S41. In the step S41, the PCM 14 operates to set the switching flag to 0. In this situation, the PCM 14 operates to keep from executing the vehicle attitude control.

After the step S35, S38, S40 or S41, the PCM 14 completes the vehicle attitude control amount setting processing subroutine, and returns to the main routine.

In the second embodiment, as shown in the chart (b) in FIG. 11, when the accelerator position is equal to or greater than the threshold $A_2$ at time t1, and, after decreasing to become less than the threshold $A_2$ at time t5, further decreases to become less than the given value $A_1$ from time t4, the PCM 14 operates, until the time t5, to set the torque reduction amount necessary to realize the target additional deceleration and generate a deceleration in the vehicle 1 by means of the reduction of the output torque of the engine 4, as shown in the charts (d) and (e) in FIG. 11, in the same manner as that in FIG. 9. Then, when the accelerator position changes at the time t5 from equal to or greater than the threshold $A_2$ to less than the threshold $A_2$, the PCM 14 operates to reduce the torque reduction amount, and starts to generate a deceleration in the vehicle 1 by the brake units 16. That is, the deceleration is generated in the vehicle 1 by means of the reduction of the output torque of the engine 4 and the braking force of the brake units 16.

As above, in the vehicle control system according to the second embodiment, when the accelerator position changes from equal to or greater than the threshold $A_2$ greater than the given value $A_1$ to less than the threshold $A_2$, in a situation where the deceleration for the vehicle attitude control is generated by means of the reduction of the output torque of the engine 4, the PCM 14 operates to generate the deceleration by means of the reduction of the output torque of the engine 4 and the braking force of the brake units 16. Thus, even in a situation where the driver stops depressing the accelerator pedal during the vehicle attitude control, the vehicle attitude control can be continued, and the reduction amount of the output torque of the engine 4 can be gradually reduced in conformity to a rising of the braking force of the brake units 16. This makes it possible to suppress fluctuation of the deceleration caused by switching of the generation source of the deceleration, thereby preventing giving the driver a feeling of strangeness.

<Modifications>

Last of all, some modifications of the above embodiments will be described.

The above embodiments have been described based on an example in which the vehicle attitude control is executed using the steering angle of the vehicle 1 as the steering angle-related value. Alternatively, the vehicle control system may be configured to execute the vehicle attitude control based on a yaw rate or a lateral acceleration, instead of the steering angle. The steering angle, the yaw rate and the lateral acceleration are includes in examples of "steering angle-related value" set forth in the appended claims.

The above embodiments have been described based on an example in which the PCM 14 operates to generate the deceleration in the vehicle 1 by means of the braking force of the brake units 16, independently of the reduction of the output torque of the engine 4. Alternatively, in addition to or in place of the braking force of the brake units 16, the deceleration may be generated in the vehicle 1 by means of: a braking force based on regenerative brake caused by rotating an alternator to generate electric power; a braking force based on engine brake caused by changing a gear ratio of an automatic transmission 26 to a lower speed side (downshifting, etc.) when the accelerator pedal is not depressed; a reduction in vehicle driving force caused by lowering the degree of engagement of (more slipping) a clutch element 28 and/or a brake element 30 inside automatic transmission 26; or a rotational resistance of an engine auxiliary component configured to be driven by the engine 4 such as an air-conditioner compressor 32, independently of the reduction of the output torque of the engine 4.

LIST OF REFERENCE SIGNS

1: vehicle
2: front road wheel
4: engine
6: steering wheel
8: steering angle sensor
10: accelerator position sensor
12: vehicle speed sensor
14: PCM
16: brake unit
18: brake control system
20: hydraulic pump
22: valve unit
24: spark plug
26: automatic transmission
28: clutch element
30: brake element
32: air-conditioner compressor

The invention claimed is:

1. A vehicle control system comprising:
an engine;
a steering wheel to be manipulated by a driver; and
a controller including a processor and configured to generate a deceleration in a vehicle to control an attitude of the vehicle, when a steering angle-related value as a parameter related to a steering angle of the steering wheel increases,
wherein the vehicle control system further comprises a vehicle deceleration generation mechanism configured to generate the deceleration in the vehicle, independently of a reduction of an output torque of the engine,
wherein the controller is configured to generate the deceleration by means of the reduction of the output torque of the engine when an accelerator position-related value as a parameter related to a position of an accelerator pedal is equal to or greater than a given value, and to generate the deceleration by the vehicle deceleration generation mechanism when the accelerator position-related value is less than the given value, and
wherein the controller is configured to generate the deceleration by means of the reduction of the output torque of the engine and by the vehicle deceleration generation mechanism, when the accelerator position-related value becomes less than a switching threshold greater than the given value, in a situation where the deceleration is generated by means of the reduction of the output torque of the engine.

2. The vehicle control system according to claim 1, wherein the accelerator position-related value is a parameter of the position of the accelerator pedal, and wherein a state in which the accelerator position-related value is less than the given value corresponds to a state in which the accelerator pedal is at an approximately fully closed position.

3. The vehicle control system according to claim 1, wherein the output torque of the engine when the accelerator position-related value is the given value is less than a reduction amount of the output torque required by the controller.

4. The vehicle control system according to claim 3, wherein the controller is configured to continue the generation of the deceleration by the vehicle deceleration generation mechanism, when the accelerator position-related value changes from less than the given value to equal to or greater than the given value, in a situation where the deceleration is generated by the vehicle deceleration generation mechanism.

5. The vehicle control system according to claim 4, wherein the controller is configured to switch a generation source of the deceleration from the engine to the vehicle deceleration generation mechanism, when the accelerator position-related value changes from equal to or greater than the given value to less than the given value, in a situation where the deceleration is generated by means of the reduction of the output torque of the engine.

6. The vehicle control system according to claim 1, wherein the controller is configured to continue the generation of the deceleration by the vehicle deceleration generation mechanism, when the accelerator position-related value changes from less than the given value to equal to or greater than the given value, in a situation where the deceleration is generated by the vehicle deceleration generation mechanism.

7. The vehicle control system according to claim 1, wherein the controller is configured to switch a generation source of the deceleration from the engine to the vehicle deceleration generation mechanism, when the accelerator position-related value changes from equal to or greater than the given value to less than the given value, in a situation where the deceleration is generated by means of the reduction of the output torque of the engine.

8. The vehicle control system according to claim 1, wherein the controller is configured to generate the deceleration in the vehicle to control the attitude of the vehicle, when the steering angle-related value increases according to a turning manipulation of the steering wheel.

9. The vehicle control system according to claim 8, wherein the steering angle-related value is a parameter of a steering speed of the steering wheel.

10. The vehicle control system according to claim 1, wherein the steering angle-related value is a parameter of a steering speed of the steering wheel.

11. A vehicle control system comprising:
an engine;
a steering wheel to be manipulated by a driver; and
a controller including a processor and configured to generate a deceleration in a vehicle to control an attitude of the vehicle, when a steering angle-related value as a parameter related to a steering angle of the steering wheel increases, wherein the vehicle control system further comprises a vehicle deceleration generation mechanism configured to generate a deceleration in the vehicle, independently of a reduction of an output torque of the engine, wherein the controller is configured to generate the deceleration by means of the reduction of the output torque of the engine when an accelerator position-related value as a parameter related to a position of an accelerator pedal is equal to or greater than a given value, and to generate the deceleration by the vehicle deceleration generation mechanism when the accelerator position-related value is less than the given value, wherein the controller is configured to switch a generation source of the deceleration from the engine to the vehicle deceleration generation mechanism, when the accelerator position-related value changes from equal to or greater than the given value to less than the given value, in a situation where the deceleration is generated by means of the reduction of the output torque of the engine, and wherein the controller is configured to generate the deceleration by means of the reduction of the output torque of the engine and by the vehicle deceleration generation mechanism, when the accelerator position-related value becomes less than a switching threshold greater than the given value, in a situation where the deceleration is generated by means of the reduction of the output torque of the engine.

12. A vehicle control system comprising:

an engine;

a steering wheel to be manipulated by a driver; and a controller including a processor and configured to generate a deceleration in a vehicle to control an attitude of the vehicle, when a steering angle-related value as a parameter related to a steering angle of the steering wheel increases, wherein the vehicle control system further comprises a vehicle deceleration generation mechanism configured to generate a deceleration in the vehicle, independently of a reduction of an output torque of the engine, wherein the controller is configured to generate the deceleration by means of the reduction of the output torque of the engine when an accelerator position-related value as a parameter related to a position of an accelerator pedal is equal to or greater than a given value, and to generate the deceleration by the vehicle deceleration generation mechanism when the accelerator position-related value is less than the given value, wherein the output torque of the engine when the accelerator position-related value is the given value is less than a reduction amount of the output torque required by the controller, wherein the controller is configured to continue the generation of the deceleration by the vehicle deceleration generation mechanism, when the accelerator position-related value changes from less than the given value to equal to or greater than the given value, in a situation where the deceleration is generated by the vehicle deceleration generation mechanism, wherein the controller is configured to switch a generation source of the deceleration from the engine to the vehicle deceleration generation mechanism, when the accelerator position-related value changes from equal to or greater than the given value to less than the given value, in a situation where the deceleration is generated by means of the reduction of the output torque of the engine, and wherein the controller is configured to generate the deceleration by means of the reduction of the output torque of the engine, and the vehicle deceleration generation mechanism, when the accelerator position-related value becomes less than a switching threshold greater than the given value, in a situation where the deceleration is generated by means of the reduction of the output torque of the engine.

\* \* \* \* \*